(No Model.)
A. R. BRADEEN.
ROPE CLAMPING HOOK.
No. 602,694. Patented Apr. 19, 1898.
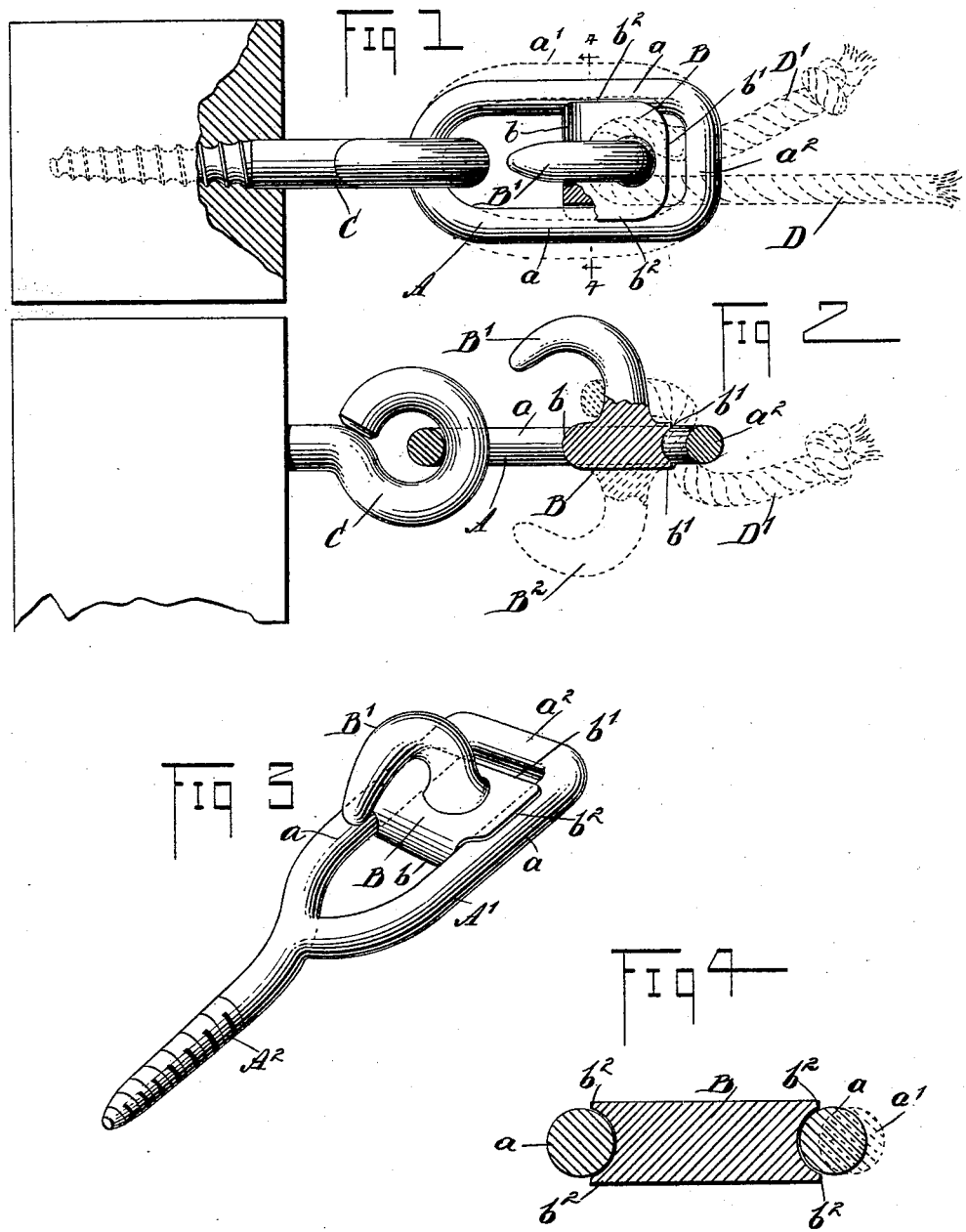

UNITED STATES PATENT OFFICE.

ANSEL R. BRADEEN, OF SEATTLE, WASHINGTON.

ROPE-CLAMPING HOOK.

SPECIFICATION forming part of Letters Patent No. 602,694, dated April 19, 1898.

Application filed August 10, 1897. Serial No. 647,725. (No model.)

*To all whom it may concern:*

Be it known that I, ANSEL R. BRADEEN, of Seattle, in the county of King and State of Washington, have invented a new and Improved Rope-Clamping Hook, of which the following is a full, clear, and exact description.

My invention relates to an improvement in devices for holding ropes, and is designed more particularly for such uses as holding the ends of hammock-ropes, clothes-lines, and for other similar purposes, although it is adapted for holding the ends of any rope for whatever purpose the rope may be employed.

My invention comprises certain novel features of construction, which will be hereinafter particularly described and claimed.

Reference is to be had to the accompanying drawings, forming a part of this specification, in which similar characters of reference indicate corresponding parts in all the views.

Figure 1 is a plan view of the device, showing the rope in place by dotted lines. Fig. 2 is a side elevation of the same. Fig. 3 is a perspective view of a slightly-modified form of construction, showing the essential features exactly the same as in Figs. 1 and 2, but a different method of supporting the device is illustrated; and Fig. 4 is a cross-section taken upon the line 4 4 of Fig. 1.

The object of my invention is to produce a cheap and secure device which may be used for securing loose ends of rope and which will be easy and certain in its action and will securely hold the rope at any point.

The invention comprises, essentially, a link A, which has the two side members or bars $a$ parallel with each other and connected at one end by a lateral section $a^2$, which preferably is made substantially at right angles to the side sections. This latter feature is not, however, essential, as the sliding block hereinafter described may be curved to fit the end section $a^2$.

Within the link formed as described is a sliding block B, which has its side edges curved to fit over the side members $a$ of the link A. The projecting edges $b^2$ upon the side of the block B embrace the sides $a$ of the link, so as to prevent the block from being removed therefrom. This block B is originally inserted in the link by forming the link slightly wider than its final width and inserting the block, after which the link is compressed, so as to cause its sides to fit closely into the concave grooves upon the side edges of the block. The expanded position of the link A is indicated by the dotted lines $a'$ in Figs. 1 and 4.

The end of the block which comes next to the end $a^2$ of the link is preferably made slightly concave, having top and bottom edges $b'$, as shown in Fig. 2. This feature is not, however, essential, as the block will hold the rope even if this end of the block is rounded. As a matter of greater security, however, it is preferred that this end be made concave, as shown. The opposite end $b$ of the block B is, however, preferably made rounded or convex, as shown in the drawings. From the block B projects a hook B', which preferably curves backward away from the end $a^2$ of the link. This curve need not be as great as that shown in the drawings, but should be sufficient to prevent the rope readily slipping from the hook when the device is in use.

The link A may be supported in any suitable manner. In Figs. 1 and 2 I have shown the link as attached to a screw eye or bolt C, which may be screwed into any convenient object. The manner of supporting the link is, however, unimportant.

In Fig. 3 I have shown the link as being formed with a screw-shank $A^2$ upon its rear end. For some purposes this would be as convenient and desirable as any form of construction. As indicated by the dotted lines in Fig. 2, the block B may be provided with two hooks, one upon each side. The position of the second hook is shown by the dotted lines $B^2$. This, however, is not thought to be desirable in most cases, but may be used wherever desired.

In using my device the free end D' of the cord D is inserted between the block B and the end $a^2$ of the link. The cord is then thrown over the hook B' or $B^2$. Strain applied to the cord D will tend to pull the block down, so as to clamp the free end of the cord between the block and the end of the link. The greater the strain applied to the rope the greater will be the pressure applied to the free end of the cord, and in consequence it will not give or slip under any strain.

By using a hook projecting from the sliding block in the manner described it is necessary to thread the free end of the cord only once through the block. This results in a considerable saving of time and increased convenience in the use of the device. If desired, the device may be used by passing the free end of the cord first back of the block B and over the end $b$ and then between the block and the end $a^2$ of the link. This, however, necessitates a double threading of the cord in the device and will take more time than when the hook is used.

Having thus described my invention, I claim as new and desire to secure by Letters Patent—

1. A rope-holding device, comprising the link having its rear end arranged for attachment to a support, and a block fitted to slide between the side bars of said link and having a hook projecting therefrom, said hook being bent toward the rear end of said link and lying within the margin of said link, as and for the purpose set forth.

2. A rope-holding device, comprising the link formed with a rear end arranged for attachment to a support and two parallel side members connected at their forward ends by a lateral section, a block having its side edges concaved and by which it is held to slide between the sides of the link and its front edge concaved to fit the lateral section of said link, and a hook projecting from a face of said block and curved backward away from the lateral section of the link, whereby strain on a rope inserted between the concaved edge of the block and a lateral section of the link and around the hook will securely clamp the same, as and for the purpose set forth.

ANSEL R. BRADEEN.

Witnesses:
EVERARD BOLTON MARSHALL,
H. L. REYNOLDS.